United States Patent
Ahern et al.

(10) Patent No.: US 7,037,357 B2
(45) Date of Patent: May 2, 2006

(54) RECOVERY OF METALS FROM JAROSITE-CONTAINING MATERIALS

(75) Inventors: Noelene Ahern, Randburg (ZA); Jozef Maria Schaekers, Randburg (ZA)

(73) Assignee: BHP Billiton SA Limited, Randburg (ZA)

( * ) Notice: Subject to any disclaimer, the term of this patent is extended or adjusted under 35 U.S.C. 154(b) by 117 days.

(21) Appl. No.: 10/658,635

(22) Filed: Sep. 8, 2003

(65) Prior Publication Data

US 2004/0118248 A1 Jun. 24, 2004

Related U.S. Application Data

(63) Continuation of application No. PCT/ZA02/00024, filed on Mar. 6, 2002.

(51) Int. Cl.
*C22B 3/12* (2006.01)

(52) U.S. Cl. ............... 75/724; 75/739; 75/743; 75/744; 205/263

(58) Field of Classification Search .......... 75/724, 75/739, 743, 744; 205/263
See application file for complete search history.

(56) References Cited

U.S. PATENT DOCUMENTS

| | | | |
|---|---|---|---|
| 4,054,638 A | 10/1977 | Dreulle et al. | |
| 4,063,933 A | 12/1977 | Peters | 73/101 R |
| 4,127,639 A | 11/1978 | Piret et al. | 423/42 |
| 4,260,588 A | 4/1981 | Piret et al. | 423/37 |
| 5,078,786 A * | 1/1992 | Peters et al. | 75/432 |
| 5,232,490 A | 8/1993 | Bender et al. | 75/733 |
| 6,319,483 B1 | 11/2001 | Kudo et al. | |

FOREIGN PATENT DOCUMENTS

EP 1 020 537 7/2000

OTHER PUBLICATIONS

Raghavan R et al., "Innovative Processing Technique to produce zinc concentrate from zinc leach residue with simultaneous recovery of lead and silver" Hydrometallurgy, Elsevier Scientific Publishing CY. Amsterdam, NL, vol. 48, No. 2, Apr. 1, 1998 (Apr. 1, 1998), pp. 225–237, XP 004127899 ISSN: 0304–386X; p. 230: Brine leaching; Tables 3 and 4.

Vinals J. et al: "Leaching of Gold, Silver and Lead from Plumbojarosite–Containing Hematite Tailings in HCL–CACL2 Media", Hydrometallurgy, Elsevier Scientific Publishing CY., Amsterdam, NL, vol. 26, No. 2, Mar. 1, 1991 (Mar. 1, 1991), pp. 179–199, XP 000201577; ISSN: 0304–386X; Abstract; p. 197, point (6) of conclusions.

Ed. By T.S. Mackey and R.D. Prengaman: "Lead–Zinc '90" 1990, The Minerals, Metals & Materials Society, Warrendale, PA USA XP 001118111 cited in the application Berezowsky RMGS et al: "Silver and gold recovery from zinc pressure leach residue", p. 135–150.

"The Jarosite Process–Past, Present an Future", V. Arregui, et al., Lead–Zinc–Tin, TMS–AIME World Symposium on Metallurgy and Environmental Control, 1980, J.M. Cigon, T.S. Mackey and T.J. O'Keefe, Eds. pp. 97–123.

* cited by examiner

*Primary Examiner*—Melvyn Andrews
(74) *Attorney, Agent, or Firm*—Brinks Hofer Gilson & Lione; G. Peter Nichols

(57) ABSTRACT

A method to dissolve at least one metal from jarosite or other iron hydroxyl sulphate containing-material which includes the steps of subjecting the material to alkaline treatment in a brine solution to facilitate jarosite decomposition, and acidification of the brine slurry to solubilise the liberated metal.

16 Claims, 1 Drawing Sheet

RECOVERY OF METALS FROM JAROSITE-CONTAINING MATERIALS

The present application is a continuation of and claims priority to PCT/ZA02/00024 filed Mar. 6, 2002, which was published in English on Sep. 12, 2002, and which claims priority to South African Patent Application No. 2001/1927 filed Mar. 8, 2001, the entire contents of both are hereby incorporated by reference.

BACKGROUND OF THE INVENTION

This invention relates to the recovery of metals from jarosite-containing materials.

The leaching of certain metals e.g. silver (Ag), lead (Pb) and zinc (Zn) using brine leaching, is well known.[1,2,3,4,5] The ease of solubilising these metals depends on the refractory nature of the material treated.

To improve recoveries from refractory materials by brine leaching, a combined high temperature oxidation process in combination with acidic brine leaching has been proposed.[4] A concentrate containing silver, mostly in sulfide minerals, yielded only 50% Ag dissolution in a $FeCl_3$ brine leach. By leaching the concentrate at temperatures above 100° C. with a high oxygen partial pressure in an acidic NaCl or $CaCl_2$ medium, the Ag recovery was increased to above 95%.

Brine leaching alone is not effective in solubilising metals included in or encapsulated by jarosite or other similar iron hydroxy sulfate compounds since these compounds must first be decomposed.

Decomposition of jarosites in alkaline media is well known. Jarosites produced during pressure leaching of zinc concentrates were decomposed by treating the residues with a lime slurry at 90° C.[7] The following reactions were proposed to describe the reactions for hydronium jarosite, plumbojarosite and argentojarosite respectively:

$H_3OFe_3(SO_4)_2(OH)_6 + 2Ca(OH)_2 + H_2O \rightarrow 3Fe(OH)_3 + 2CaSO_4.2H_2O$ $PbFe_6(SO_4)_4(OH)_{12} + 4Ca(OH)_2 + 8H_2O \rightarrow 6Fe(OH)_3 + Pb(OH)_2 + 4CaSO_4.2H2O$ $AgFe_3(SO_4)_2(OH)_6 + 2Ca(OH)_2 + 4H_2O \rightarrow 3Fe(OH)_3 + AgOH + 2CaSO_4.2H_2O$ After liberation, Ag was subsequently recoverable by cyanidation.[7]

Destruction of jarosites produced in pressure leaching at 85° C. to 90° C. using an approximately stoichiometric quantity of lime, followed by cyanidation, improved Ag recoveries from less than 5% to more than 97%.[9]

NaOH has also been used to facilitate alkaline decomposition of jarosite-type materials before cyanidation.[8]

Leaching of jarosite-containing materials in an acidic brine medium of $CaCl_2$ at a temperature above the boiling point of the solution and elevated pressures, in the presence of lime or another suitable alkali to maintain the pH between 1.5 and 3.5, has been proposed to recover metals from jarosite[6]. Although this method was successful to recover Ag and Pb from jarosites the use of high pressures and temperatures is not always desirable.

It seems obvious that if metal recovery from jarosites is required, an alkaline pretreatment followed by cyanidation is a generally accepted and suitable method. However, cyanide has environmental disadvantages, and in some cases, cyanide consumption is too high for such a process to be economical, particularly in the presence of base metals like Cu, and sulfides.

Also, it is implied that jarosite-containing materials can be pretreated in an alkaline medium to liberate certain metals and that, once the metals are in suitable forms, brine leaching can be used to solubilise them. However, this treatment implies the use of a liquid/solid separation step between the alkaline decomposition stage and the acidic brine solubilisation, and additional process steps and costs. There would be advantages to eliminating this liquid/solid separation, by carrying out the alkaline decomposition in a brine medium followed immediately by acidification to solubilise the required metals. Also, the alkaline decomposition step is shown to be facilitated in a brine solution.

SUMMARY OF INVENTION

The invention provides a method to dissolve at least one metal from jarosite or other iron hydroxy sulfate-containing material which includes the steps of:

a) subjecting the material to alkaline treatment in a brine solution to facilitate jarosite decomposition, and b) acidification of the brine slurry to solubilise the liberated metal.

The method may include the step of adjusting the pH of the brine slurry to remove solubilised iron or other impurities from the slurry followed by the step of separating metal-containing brine solution and solid residue from each other.

The metal value or values can be removed from the brine solution by any appropriate means selected, for example, from: cementation, ion exchange, solvent extraction, electrowinning and precipitation. After metal recovery, the barren brine liquor may be recycled to the alkaline treatment stage. A bleed stream may be introduced to control impurities, and additional NaCl and water may be added on recycle to compensate for any losses. Preferably the temperature in the alkaline treatment stage is between 30° C. and 100° C.

Alkali may added to the brine solution in the form of lime, NaOH, LiOH or any other suitable alkali, or any combination thereof.

Preferably the brine concentration is between 100 g/l NaCl and saturation levels, or the equivalent of any other soluble chloride salt.

The temperature in the acidic brine leach stage may be between 30° C. and 100° C.

The pH of the acidic brine leach stage is preferably less than 6.

The method may be used particularly for the recovery of silver.

BRIEF DESCRIPTION OF THE DRAWING

The invention is further described by way of examples with reference to the accompanying drawing which is a flow chart representation of the method of the invention.

DESCRIPTION OF PREFERRED EMBODIMENT

Figure 1:
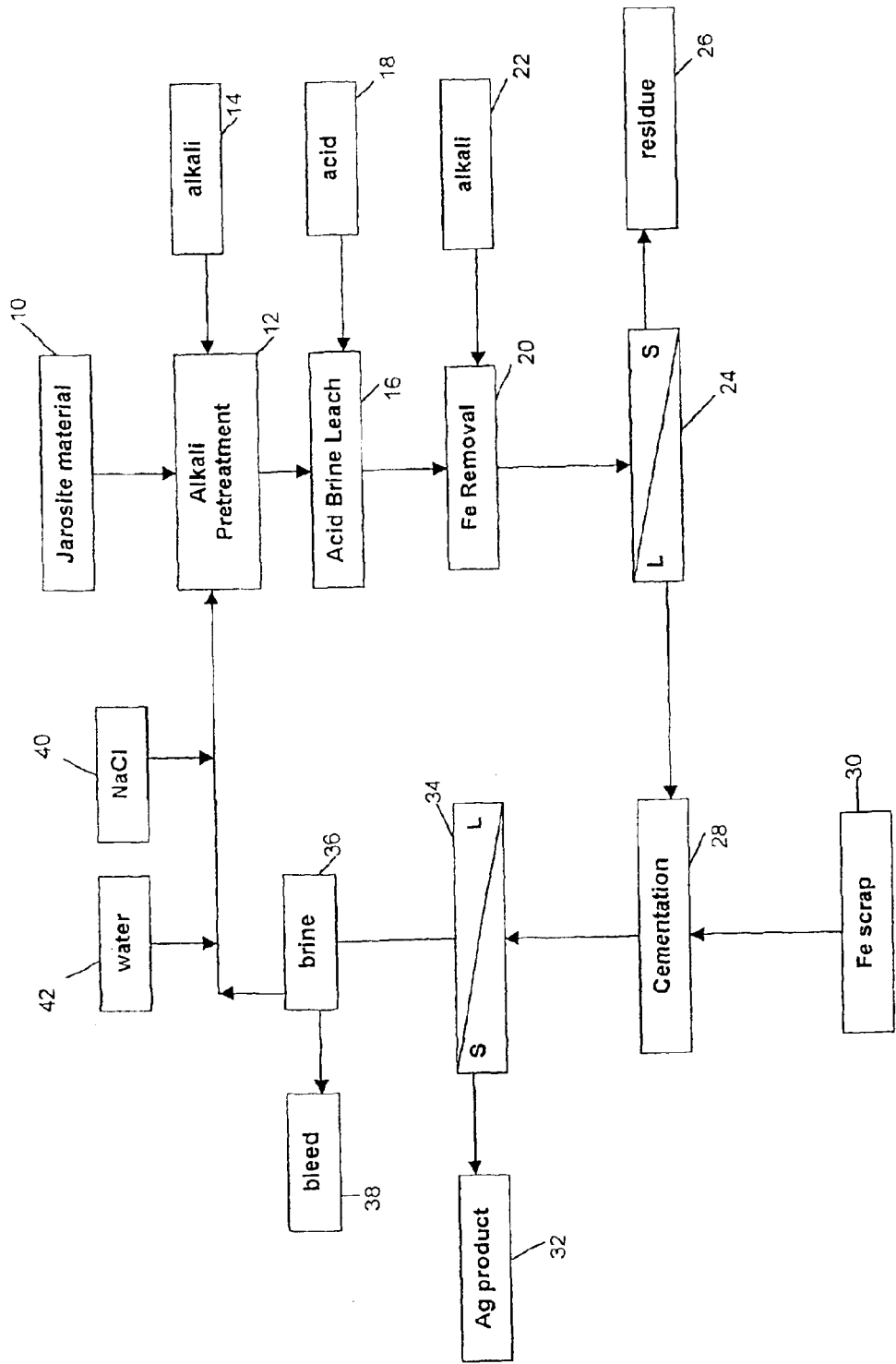

Referring to the accompanying drawing, a silver and jarosite-containing residue (10) is typically obtained by subjecting a silver-bearing material to a leaching process (e.g. bioleaching or pressure leaching) or by subjecting a silver and iron containing liquor to a precipitation process (e.g. iron removal).

The residue is subjected to an alkaline pretreatment in a brine medium (12). The liquid to solid ratio should be sufficient to ensure ease of operation and to ensure that no solubility constraints exist for the silver. The brine solution or slurry should contain from 100 g/l NaCl to saturation levels, preferably 200 g/l to 300 g/l. The brine solution may contain various impurities, including sulfate. Sulfate levels of up to 10 g/l may be acceptable, but less than 5 g/l are expected if lime is used as the alkali. The slurry should be maintained at a temperature of 30° C. to 100° C., preferably 50° C.–90° C.

An alkali (14), such as lime, is added to the slurry either to maintain an alkaline pH (>7), preferably greater than or equal to 9, and less than 13, or at a fixed addition rate based on the stoichiometry of the alkaline decomposition reaction.

The reaction is allowed to continue for a time depending on the composition of the material and the reaction temperature and pH. Usually a few hours are sufficient but more than 24 hours may be required in some cases, particularly in the lower pH or temperature ranges.

The alkaline brine slurry is then acidified (step 16), without any intermediate liquid/solid separation, by the addition of any suitable acid (18), preferably HCl or $H_2SO_4$, to a pH most suitable for the metal that is to be dissolved. For Ag, the pH should be greater than 0.1 and less than 6, preferably between 1 and 3.

The temperature of the acidic brine leach can be the same as that used in the alkaline pretreatment step (30° C.–100° C.) and is preferably 70° C.–90° C.

As for the alkaline pretreatment stage, the residence time required for the acid leaching stage is variable, but is not expected to be longer than 8 hours.

An iron removal stage 20 may be included where the pH of the slurry is increased slightly by the addition of a suitable alkali 22, to precipitate iron. The pH should be less than 5.

After liquid/solid separation (24) to remove the solid residue 26, Ag is recovered by any suitable means, in this case, cementation 28 with Fe scrap 30. The Ag product is removed by liquid/solid separaton (34) and the barren brine solution 36 is recycled to the alkaline pretreatment step (12).

Part of the brine solution 36 may be removed as a bleed stream 38 to control impurity build up. Also it may be necessary to add NaCl (40) and water 42 to make up the stream recycled to the stage 12.

EXAMPLE 1

A residue containing about 70% of Ag in jarosite was slurried with a 260 g/l NaCl solution at 80° C. at a liquid to solid ratio of 10:1. The natural pH of the slurry ranged between 1.8 and 2.4. After leaching for 6 hours, the Ag dissolution was 22%.

This indicates that brine leaching alone is not sufficient to recover Ag from jarosite-type materials.

EXAMPLE 2

A residue containing about 70% of Ag in jarosite was slurried with a 260 g/l NaCl solution at 70° C. at a liquid to solid ratio of about 7:1. Lime was added as a slurry to 145 kg $Ca(OH)_2$ per ton of sample, based on a stoichiometric excess of 20%, and the slurry was agitated for 2 hours. The slurry was then acidified to pH 2 by adding 97 kg $H_2SO_4$ per ton of sample, and agitated for a further 5 hours. Ag dissolution of 94% was obtained.

This illustrates the process of the invention using a fixed amount of alkali.

EXAMPLE 3

A residue containing about 70% of Ag in jarosite was slurried with a 260 g/l NaCl solution at 80° C. at a liquid to solid ratio of about 7:1. Lime was added as a slurry to maintain a constant pH of 9. After 3 hours, 126 kg $Ca(OH)_2$ per ton of sample had been consumed. The slurry was then acidified to pH 2 by adding 87 kg $H_2SO_4$ per ton of sample and allowed to react for a further 5 hours. Ag dissolution of 93% was achieved.

This illustrates the process of the invention using a set pH during the alkali treatment.

EXAMPLE 4

A residue containing about 70% of Ag in jarosite was slurried with a 260 g/l NaCl solution at 70° C. at a liquid to solid ratio of about 7:1. Lime was added as a slurry to maintain a constant pH of 9.5. After 4 hours, 181 kg $Ca(OH)_2$ per ton of sample had been consumed. The slurry was then acidified to pH 2 by adding 100 kg $H_2SO_4$ per ton of sample and allowed to react for a further 5 hours. Ag dissolution of 94% was achieved.

This test was repeated, but excluding brine from the alkaline decomposition stage. After 24 hours, 83 kg $Ca(OH)_2$ per ton of sample had been consumed. The slurry was then acidified by adding 54 kg $H_2SO_4$ per ton of sample and allowed to react for a further 5 hours. Ag dissolution of 43% was achieved.

This illustrates that the presence of brine in the alkaline decomposition stage facilitates the decomposition of jarosite.

EXAMPLE 5

A residue containing about 70% of Ag in jarosite was slurried with a 260 g/l NaCl solution at 70° C. at a liquid to solid ratio of about 7:1. Lime was added as a slurry to 145 kg $Ca(OH)_2$ per ton of sample, based on a stoichiometric excess of 20%, and the slurry was agitated for 2 hours. The slurry was then acidified to pH 2 by adding 131 kg $H_2SO_4$ per ton of sample, and agitated for a further 5 hours.

To remove Fe from the circuit, limestone was added as a solid to establish a pH of 3.7. The solid residue was then separated from the brine solution. Overall Ag dissolution of 87% was obtained.

This illustrates the process of the invention when an iron removal stage is included.

EXAMPLE 6

The same procedure was carried out as for example 2, except that the temperature during alkaline pretreatment was 50° C., not 70° C. Acid consumption in the acid leach step was 164 kg $H_2SO_4$ per ton, and Ag dissolution was only 63%.

This example illustrates the importance of temperature in the alkaline treatment stage.

EXAMPLE 7

A residue containing about 70% of Ag in jarosite was slurried with a 260 g/l NaCl solution at (a) 70° C. and (b) 80° C. at a liquid to solid ratio of about 7:1. Lime was added as a slurry to maintain a constant pH of 9 for both tests, and the slurry was agitated until no further lime additions were necessary to maintain the set pH. The slurries were then acidified to pH 2 by adding (a) 82 and (b) 87 kg $H_2SO_4$ per ton of sample respectively, and agitated for a further 5 hours.

In both cases, Ag dissolution was 93%. However, where the alkali treatment was done at 70° C., 7.5 hours were required to complete this stage, while at 80° C., only 3 hours were required.

This example illustrates the effect of temperature and time on the proposed process.

REFERENCES

1. Raghavan R, Mohanan P K, Swamkar S R, 'Hydrometallurgical processing of lead-bearing materials for the recovery of lead and silver as lead concentrate and lead metal', Hydrometallurgy 58, 2000, p103–116.
2. Gallagher N P, Lei K P V, 'Recovery of lead and silver from plumbojarostie by hydrothermal sulfidation and chloride leaching', Report of Investigations 9277, US Department of the Interior, Bureau of Mines.
3. Sandberg R G, Huiatt J L, 'Recovery of silver, gold, and lead from a complex sulphate ore using ferric chloride, thiourea, and brine leach solutions', Report of Investigations 9022, US Department of the Interior, Bureau of Mines.
4. Bahr A, Proesemann T, 'Recovery of silver from refractory ores', XVI International Mineral Processing Congress, Stockholm, Jun. 5–10, 1988, Part B. E Forssberg (Ed.).
5. Martin D, Diaz G, 'Hydrometallurgical treatment of lead secondaries and/ore low grade concentrates: the Placid and Ledclor processes', Conference: Recycling lead and zinc—the challenge of the 1990's, Rome 11–13 June 1991, International Lead and Zinc Study Group.
6. Peters M A, Hazen W W, Reynolds J E, 'Process for recovering metal values from jarosite solids', U.S. Pat. No. 5,078,786, 7 Jan. 1992.
7. Berezowsky R M G S, Stiksma J, Kerfoot D G E, Krysa B D, 'Silver and gold recovery from zinc pressure leach residue', Lead-Zinc '90, T S Mackey and R D Prengaman (Eds.), The Minerals, Metals and Materials Society, 1990.
8. Patino F, Salinas E, Cruells M, Roca A, 'Alkaline decomposition-cyanidation kinetics of argentian natrojarosite', Hydrometallurgy 49, 1998, p323–336.
9. Thompson P. Diaz M, Plenge G, 'Pressure oxidation of silver-bearing sulphate flotation concentrates', Mining Eng., September 1993, p1195–1200.

What is claimed is:

1. A method to dissolve at least one metal from jarosites or other iron hydroxy sulfate containing-material which includes the sequential steps of:
   a. subjecting the material to alkaline treatment in a brine solution with a pH above 7 and at a temperature of from 30° C. to 100° C. to facilitate jarosite decomposition and produce a brine slurry which contains the metal; and
   b. acidifying the brine slurry by reducing the pH of the slurry to less than 6 to solubilise the metal.
2. The method of claim 1 further comprising subsequent to acidifying the brine slurry, adjusting the pH of the brine slurry to remove solubilised iron or other impurities from the liquid phase of the slurry followed by separating a metal-containing brine solution and solid residue from each other.
3. The method of claim 2 further comprising removing a metal value from the brine solution using a technique selected from the group consisting of cementation, ion exchange, solvent extraction, electrowinning, or precipitation.
4. The method of claim 3 wherein, after the step of removing the metal value, a barren brine liquor is produced and is recycled for use in the alkaline treatment (step a).
5. The method of claim 4 which includes the steps of bleeding impurities from the barren brine liquor and adding NaCl and water to the barren brine liquor prior to the alkaline treatment.
6. The method of claim 1 wherein the alkaline treatment is conducted at temperature between about 50° C. to about 90° C.
7. The method of claim 1 wherein the brine concentration of the brine solution is between 100 g/l soluble chloride salt and saturation levels.
8. A method according to claim 7 wherein the brine concentration of the brine solution is between 200 g/l and 300 g/l soluble chloride salt.
9. The method of claim 8 wherein the soluble chloride salt is NaCl.
10. The method of claim 1 wherein the temperature of the brine slurry during step (b) is between 30° C. and 100° C.
11. The method of claim 10 wherein the temperature of the brine slurry during step (b) is between 50° C. and 90° C.
12. The method of claim 1 wherein the pH of the brine solution during step (a) is between 9 and 13.
13. The method of claim 1 wherein the pH of the brine slurry during step (b) is between 1 and 3.
14. The method of claim 1 wherein the duration of step (a) is less than 24 hours.
15. The method of claim 1 wherein the duration of step (b) is less than 8 hours.
16. The method of claim 1 wherein the at least one metal is silver.

* * * * *